United States Patent Office.

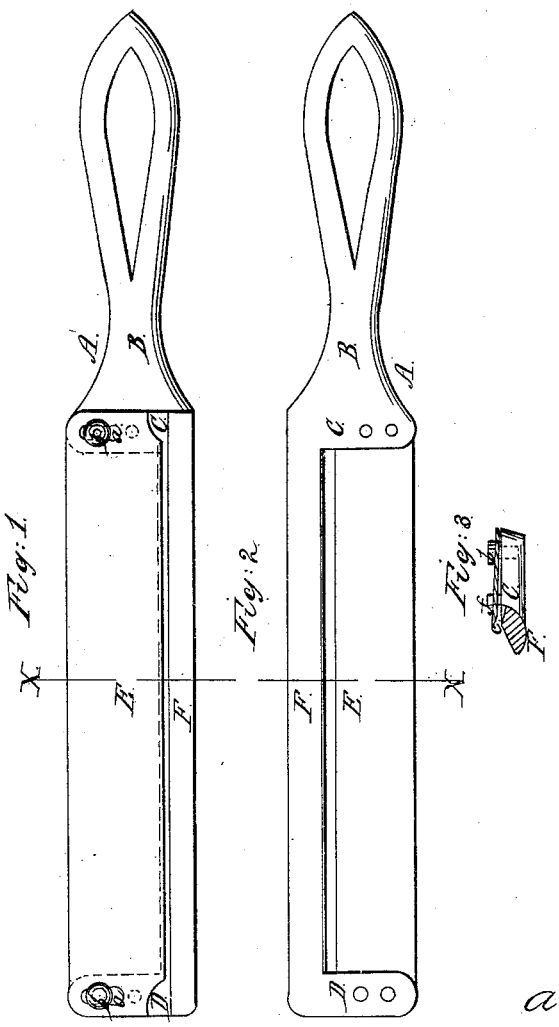

ALBERT M. FORCE, OF NORWICH, CONNECTICUT, ASSIGNOR TO HIMSELF AND A. H. VAUGHN, OF THE SAME PLACE.

Letters Patent No. 63,236, dated March 26, 1867.

IMPROVED MEAT SLICER.

The Schedule referred to in these Letters Patent and making part of the same.

TO ALL WHOM IT MAY CONCERN:

Be it known that I, ALBERT M. FORCE, of Norwich, in the county of New London, and State of Connecticut, have invented a new and improved Implement for Slicing Meat, etc.; and I do hereby declare that the following is a full, clear, and exact description thereof, which will enable others skilled in the art to make and use the same, reference being had to the accompanying drawings, forming part of this specification.

The present invention relates to an implement for the slicing of dried meats more particularly, although it can be employed for slicing other articles of food, as, for instance, bread, vegetables, etc. This implement consists of a holder having a suitable handle at one end, and a knife or cutting blade, which is secured thereto in the direction of its length in such a manner that, as its cutting edge wears away, it can be properly adjusted to compensate for the same, and also set to cut any desired thickness of slices, the holder being extended beyond and along the entire length of the cutting edge of the knife-blade, with its surface flared or bevelled outward therefrom, so as to form a more perfect rest for the implement when brought against the meat, etc. In the accompanying plate of drawings my improved slicing implement is illustrated—

Figures 1 and 2 being face views of the implement upon its front and back side respectively; and Figure 3 a transverse vertical section taken in the plane of the line $x\ x$, figs. 1 and 2.

Similar letters of reference indicate like parts.

A, in the drawings, represents the holder of my improved slicer. This holder, at one end, has a handle, B, of suitable shape for being grasped by the hand; and from the inner end C of such handle to the outer cross-piece D of the holder, a knife and cutting blade E is placed, and there secured at each end, by a slot, $a$, and set-screw, $b$. The holder A, below the knife-blade, is cut out or left open, as plainly shown in fig. 2 of the drawings, with a rib or bar, F, directly below the cutting edge of the knife, between which and such bar a space or opening, $c$, is left, the knife being bevelled upon its under side or that toward the said bar, but flat upon its upper side. The bar F is extended beyond the cutting edge of the knife, outward from which it is bevelled or flared, as shown in fig. 3 of the drawings. $f$ set-screws on under side of holder A, by the screwing in or out of which the cutting edge of the blade E can be adjusted to a greater or lesser amount of opening between it and the rib or bar F of the holder.

To use the implement above described, it is first taken or grasped by its handle, with the hand, when, bringing it to bear by the flared or bevelled edge of its bar F against the meat, etc., which it is intended to slice, by then properly bearing down upon the implement, it will be made to cut from the meat a slice which in thickness will correspond to the adjustment or position of the knife edge with regard to the bar or rail E, or, in other words, whether more or less space or opening is left between them. By securing the knife-blade to the holder, through a slot and set-screw, as hereinabove described, it can be set up to its work as it wears away from use; and furthermore, by bevelling or flaring the rail or bar F outward from the knife edge, a more perfect bearing or rest for the implement against the meat is obtained.

I claim as new, and desire to secure by Letters Patent—

1. The outwardly-flaring bar F, secured to the holder A, operating in combination with the adjustable slotted knife E, substantially as and for the purpose specified.

2. The slicer, the parts of which consist of the handle B, holder A, outwardly-flaring bar F, slotted knife E, set-screw $b$, set-screws F, substantially as described.

The above specification of my invention signed by me this 19th day of December, 1866.

A. M. FORCE.

Witnesses:
WM. F. McNAMARA,
ALBERT W. BROWN.